US009921866B2

(12) United States Patent
Ganguli et al.

(10) Patent No.: US 9,921,866 B2
(45) Date of Patent: Mar. 20, 2018

(54) CPU OVERPROVISIONING AND CLOUD COMPUTE WORKLOAD SCHEDULING MECHANISM

(71) Applicants: Mrittika Ganguli, Bangalore (IN); Rajneesh Bhardwaj, Bangalore (IN); Ananth Sankaranarayanan, Bangalore (IN); Sunil Raghavan, Bangalore (IN); Subramony Sesha, Bangalore (IN); Gilbert Hyatt, Hillsboro, OR (US); Muralidharan Sundararajan, Portland, OR (US); Arkadiusz Chylinski, Gdansk (PL); Alok Prakash, Hillsboro, OR (US)

(72) Inventors: Mrittika Ganguli, Bangalore (IN); Rajneesh Bhardwaj, Bangalore (IN); Ananth Sankaranarayanan, Bangalore (IN); Sunil Raghavan, Bangalore (IN); Subramony Sesha, Bangalore (IN); Gilbert Hyatt, Hillsboro, OR (US); Muralidharan Sundararajan, Portland, OR (US); Arkadiusz Chylinski, Gdansk (PL); Alok Prakash, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 2 days.

(21) Appl. No.: 14/578,629

(22) Filed: Dec. 22, 2014

(65) Prior Publication Data
US 2016/0179560 A1 Jun. 23, 2016

(51) Int. Cl.
G06F 9/50 (2006.01)
G06F 9/455 (2018.01)

(52) U.S. Cl.
CPC ........ *G06F 9/45558* (2013.01); *G06F 9/5055* (2013.01); *G06F 2009/45591* (2013.01)

(58) Field of Classification Search
CPC ................ G06F 7/78; G06F 8/00–8/78; G06F 9/44–9/455; G06F 11/36
See application file for complete search history.

(56) References Cited

U.S. PATENT DOCUMENTS

| 2008/0295096 A1* | 11/2008 | Beaty ................... G06F 9/4856 718/1 |
| 2008/0301024 A1* | 12/2008 | Boss ...................... G06Q 30/06 705/37 |

(Continued)

FOREIGN PATENT DOCUMENTS

TW 201407476 2/2014

OTHER PUBLICATIONS

Borgetto et al., Energy-efficient and SLA-Aware Management of IaaS Clouds, 2012, 10 pages.*

(Continued)

*Primary Examiner* — S Sough
*Assistant Examiner* — Zhan Chen
(74) *Attorney, Agent, or Firm* — Womble Bond Dickinson (US) LLP

(57) ABSTRACT

A method comprising is described. The method includes receiving a virtual machine and a service level objective compute consumption metrics (SLO) parameters from a cloud controller, mapping the SLO parameters to resources at the compute node, monitoring utilization and performance of the virtual machine and dynamically adjusting performance of the virtual machine based on monitored performance data.

24 Claims, 7 Drawing Sheets

(56) References Cited

U.S. PATENT DOCUMENTS

| | | | |
|---|---|---|---|
| 2010/0235836 A1* | 9/2010 | Bratanov | G06F 9/45533 |
| | | | 718/1 |
| 2011/0185064 A1* | 7/2011 | Head | G06F 9/5077 |
| | | | 709/226 |
| 2012/0030670 A1 | 2/2012 | Vijay et al. | |
| 2013/0100816 A1* | 4/2013 | Bergamasco | H04L 43/0864 |
| | | | 370/237 |
| 2013/0132561 A1 | 5/2013 | Pasala et al. | |
| 2013/0185729 A1 | 7/2013 | Vasic et al. | |
| 2013/0290541 A1* | 10/2013 | Hatasaki | G06F 9/5077 |
| | | | 709/226 |
| 2013/0339424 A1 | 12/2013 | Pasala et al. | |
| 2014/0130055 A1 | 5/2014 | Guha | |

OTHER PUBLICATIONS

Choi et al, A Cost-Efficient Mechanism for Dynamic VM Provisioning in Cloud Computing, 2014, pp. 344-349.*
PCT Search Report and Written Opinion, PCT/US2015/060409, 12 pages, dated Apr. 20, 2016.
TW IPO Search Report, TW Application No. 104138150, dated Dec. 16, 2016, 2 pages.
Notice of Allowance in Taiwanese Application No. 104138150 dated Mar. 29, 2017, 2 pages.
International Preliminary Report on Patentability for PCT/US2015/060409 dated Jun. 27, 2017, 8 pages.

\* cited by examiner

CPU OVERPROVISIONING AND CLOUD COMPUTE WORKLOAD SCHEDULING MECHANISM

FIELD

Embodiments described herein generally relate to computer systems. More particularly, embodiments relate to cloud computing.

BACKGROUND

Cloud computing refers to highly scalable networked computing systems capable of delivering elastic computing performance to numerous users. Cloud computing typically involves clusters of densely packed computing servers, called nodes, with each node potentially executing dozens of virtual machines. Typically, each node includes a hypervisor or other virtualization framework, and the entire cloud computing cluster includes one or more cloud controllers that manage instantiation of virtual machines on the particular compute nodes. OpenStack is one example of such a cloud computing framework.

In a multi-tenant cloud computing environment, different customers may control the virtual machines on a particular node. Thus, the resources of the node, such as processor, network, and storage resources, must be shared among the virtual machines and thus among different customers. When a virtual machine is created, the user selects an instance type that specifies the resource requirements of the virtual machine. Static resource requirements include a number of virtual central processing units (vCPUs), memory, disk and network.

Such requirements for a cloud service provider (CSP) has two challenges. The first challenge is that the CSP must provide the promised resources to the virtual machine instance at the same performance in any server system, regardless of the CPU and other hardware components. Thus, the CSP must define a performance metric and ensure that each virtual machine meets the performance. However, this requirement has often not been met consistently. The second challenge is that there should be a maximum use of the provisioned infrastructure. Thus, the CSP may often wish to overprovision CPU and memory to a limit that maximizes use of infrastructure and minimizes difference in performance degradation.

Existing overprovisioning solutions suggest using an optimum ratio. However when implementing such solutions performance degradation occurs when overprovisioning in instances where a virtual machine is assigned four or more vCPUs. For example if a first virtual machine (VM1) is allocated 4 vCPUs, one of which is assigned on a first physical CPU (pCPU1) and a second virtual machine (VM2) is assigned 1 vCPU which is also on pCPU1, then VM1 will have to wait for its vCPU to be free as it was shared by VM2. If VM1's 3 other vCPUs are shared with other VMs, VM1 would have to wait much longer for all its vCPUs to be free. This results in performance delays for VM1.

Such degradation is currently being remedied by not overprovisioning virtual vCPUs (e.g., starting with a single vCPU and scaling out when is necessary); monitoring workload usage, CPU ready and CPU utilization metrics and re-sizing virtual machines; and migrating a virtual machine to a server that has relatively free resources, or has not been overprovisioned. However, not overprovisioning is a generic recommendation that does not guarantee a performance Service Level Agreement (SLA) that is met on every single server system every single unit of time. Further, monitoring and re-sizing virtual machines requires a virtual machine to start slow with less vCPUs and add more, thus requiring infrastructure to be free or not fully utilized always. Moreover, migrating a virtual machine may result in the same performance delay once a destination server has full allocated capacity.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

The present invention may be embodied in systems, apparatuses, and methods for workload scheduling in a cloud computing environment, as described below. In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

According to one embodiment, server resource utilization is maximized, while ensuring that the SLA is always honored. In such an embodiment, a service level objective (SLO) is defined based on processor performance characteristics. In a further embodiment, virtual machine instance types are defined based on SLO parameters in order to capture the resource requirements of the virtual machine. In still a further embodiment, the virtual machine is scheduled on a node and managed according to the user-defined SLO parameters and the current server state. Still further, the SLO parameters are stored and transmitted to various server nodes.

According to one embodiment, the virtual machine SLO parameters are translated to platform resources (e.g., compute time, processor frequency, cache, memory/disk/network bandwidth, memory size). In other embodiments, the virtual machine is continuously monitored to detect SLO violations based on the translated parameters. In such embodiments, dynamic adjustments are made in the form of corrective actions that are applied to restore performance that complies with the SLO parameters.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are microcode, writable control store, and micro-programmed structure.

Figure 1:
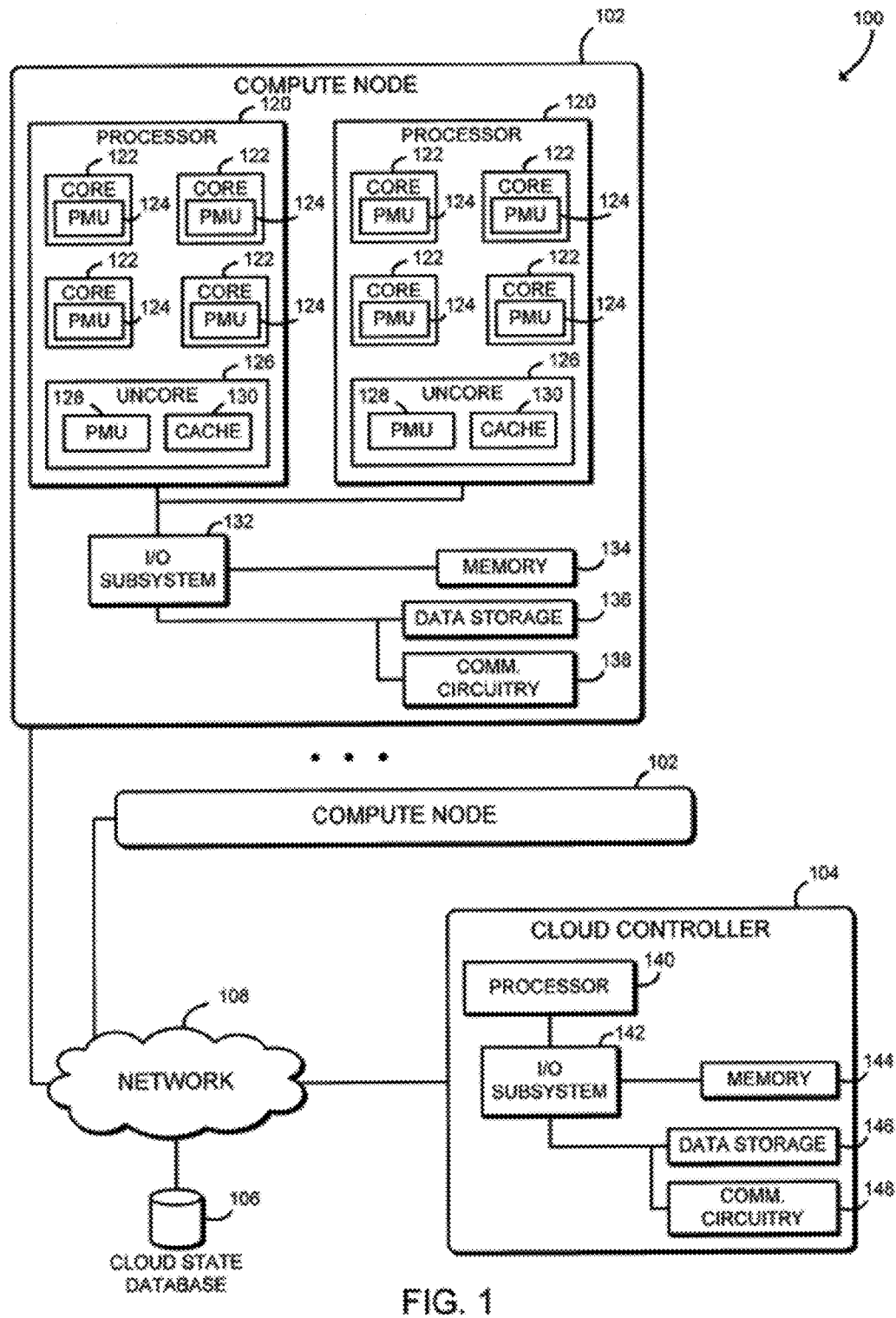
FIG. 1 illustrates one embodiment of a cloud computing system.

FIG. 1 illustrates one embodiment of an information processing system 100. System 100 includes a number of compute nodes 102, a cloud controller 104, and a cloud state database 106, all in communication over a network 108. In use, as discussed in more detail below, each compute node 102 instantiates one or more virtual machines to perform computational tasks. Each compute node 102 monitors its performance, including cache contention, and generates contention and capacity scores. The contention scores for each compute node 102 are stored in the cloud state database 106. The cloud controller 104 monitors the contention scores and schedules new virtual machines based on the reported contention scores of each of the compute nodes 102.

In one embodiment, each compute node 102 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. Each compute node 102 illustratively includes two processors 120, an input/output subsystem 132, a memory 134, a data storage device 136, and communication circuitry 138. Of course, the compute node 102 may include other or additional components, such as those commonly found in a server device (e.g., various input/output devices), in other embodiments. Additionally, in some embodiments, one or more of the illustrative components may be incorporated in, or otherwise form a portion of, another component. For example, memory 134, or portions thereof, may be incorporated in one or more processor 120 in some embodiments.

Each processor 120 may be embodied as any type of processor capable of performing the functions described herein. Each illustrative processor 120 is a multi-core processor, however in other embodiments each processor 120 may be embodied as a single or multi-core processor(s), digital signal processor, microcontroller, or other processor or processing/controlling circuit. Each processor 120 illustratively includes four processor cores 122 and an uncore 126. Each of the processor cores 122 is an independent processing unit capable of executing programmed instructions.

Each processor core 122 includes a performance monitoring unit ("PMU") 124. Each PMU 124 may be embodied as a number of performance counters capable of recording and monitoring the flow of instructions through the respective processor core 122. For example, each PMU 124 may be capable of counting clock cycles, instructions issued, instructions retired, cache misses, or similar events. The PMUs 124 may be programmed to monitor particular performance statistics using model-5 specific registers of the processor core 122. In one embodiment, each PMU 124 may include four fully programmable hardware counters and three fixed-function hardware counters. Software may access the PMUs 124 using a kernel interface such as the "perf" subsystem of the Linux kernel. Although each of the illustrative compute nodes 102 includes two processors 120 having four sockets of 8 processor cores 122; each compute node 102 may include one, two, or more processors 120 having one, two, or more processor cores 122 each in other embodiments. In particular, this disclosure is also applicable to uniprocessor or single-core compute nodes 102.

Each processor 120 also includes an uncore 126. In the illustrative embodiment, each uncore 126 includes any part of the particular processor 120 not included in the processor cores 122 (e.g., all components of the particular processor 120 except for the processor cores 122 themselves). For example, the uncore 126 of each illustrative processor 120 includes a PMU 128 and cache memory 130. Similar to the PMUs 124 of the processor cores 122, the PMU 128 monitors performance statistics of the uncore 126, and may include a number of programmable or fixed-function hardware performance counters. The cache memory 130 may be a last-level cache shared by the processor cores 122. In some embodiments, the PMU 128 may monitor accesses to the cache memory 130, including recording cache misses, amounts of data transferred, and other cache information. Although not illustrated, the uncore 126 may additionally include typical components of a processor or a system-on-a-chip. For example, each uncore 126 may include a memory controller, processor graphics, input/output controllers, power management circuitry, or other components of the processor 120.

The memory 134 may be embodied as any type of volatile or non-volatile memory or data storage capable of performing the functions described herein. In operation, the memory 134 may store various data and software used during operation of the compute node 102 such as operating systems, applications, programs, libraries, and drivers. The memory 134 is communicatively coupled to the processor 120 via the I/O subsystem 132, which may be embodied as circuitry and/or components to facilitate input/output operations with the processor 120, the memory 134, and other components of the compute node 102. For example, the I/O subsystem 132 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 132 may form a portion of a system-on-a-chip (SoC) and be incorporated, along with the processor 120, the memory 134, and other components of the compute node 102, on a single integrated 5 circuit chip.

The data storage device 136 may be embodied as any type of device or devices configured for short-term or long-term storage of data such as, for example, memory devices and circuits, memory cards, hard disk drives, solid-state drives, or other data storage devices. The data storage device 136 may store performance statistics monitored by the compute node 102. The communication circuitry 138 of the compute node 102 may be embodied as any communication circuit, device, or collection thereof, capable of enabling communications between the compute node 102, the cloud controller 104, the cloud state database 106, and/or other remote devices over the network 810. The communication circuitry 138 may be configured to use any one or more communication technology (e.g., wired or wireless communications) and associated protocols (e.g., Ethernet, Bluetooth®, Wi-Fi®, WiMAX, etc.) to effect such communication.

In one embodiment, cloud controller 104 manages virtual machines or other compute instances distributed among the compute nodes 102 of the system 100. Cloud controller 104 may be embodied as any type of server computing device, or collection of devices, capable of performing the functions described herein. As such, cloud controller 104 may be embodied as a single server computing device or a collection of servers and associated devices. For example, in some embodiments, cloud controller 104 may be embodied as a "virtual server" formed from multiple computing devices distributed across network 108 and operating in a public or private cloud. Accordingly, although cloud controller 104 is illustrated in FIG. 1 as embodied as a single server computing device, it should be appreciated that cloud controller 104 may be embodied as multiple devices cooperating together to facilitate the functionality described below. Illustratively, cloud controller 104 includes a processor 140, an I/O subsystem 142, a memory 144, a data storage device 146, communication circuitry 148, and/or other components and devices commonly found in a server or similar computing device. Those individual components of cloud controller 104 may be similar to the corresponding components of compute nodes 102, the description of which is applicable to the corresponding components of the cloud controller 104 and is not repeated herein so as not to obscure the present disclosure.

Cloud state database 106 stores information that is synchronized across system 100, including performance statistics. Cloud state database 106 may be embodied as a dedicated database server, distributed data storage, or any other data storage system capable of maintaining consistent state for the system 100. As such, copies or portions of cloud state database 106 may be stored in data storage 136 of each compute node 102 and/or the data storage 146 of cloud controller 104. Updated cloud state information may be transferred between compute nodes 102, cloud controller 104, and/or the cloud state database 106 using any communication protocol. In some embodiments, cloud state information may be transferred asynchronously using a message bus, for example a message bus implementing the advanced message queuing protocol (AMQP), such as rabbitmq.

As discussed in more detail below, compute nodes 102, cloud controller 104, and cloud state database 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of system 100.

Figure 2:
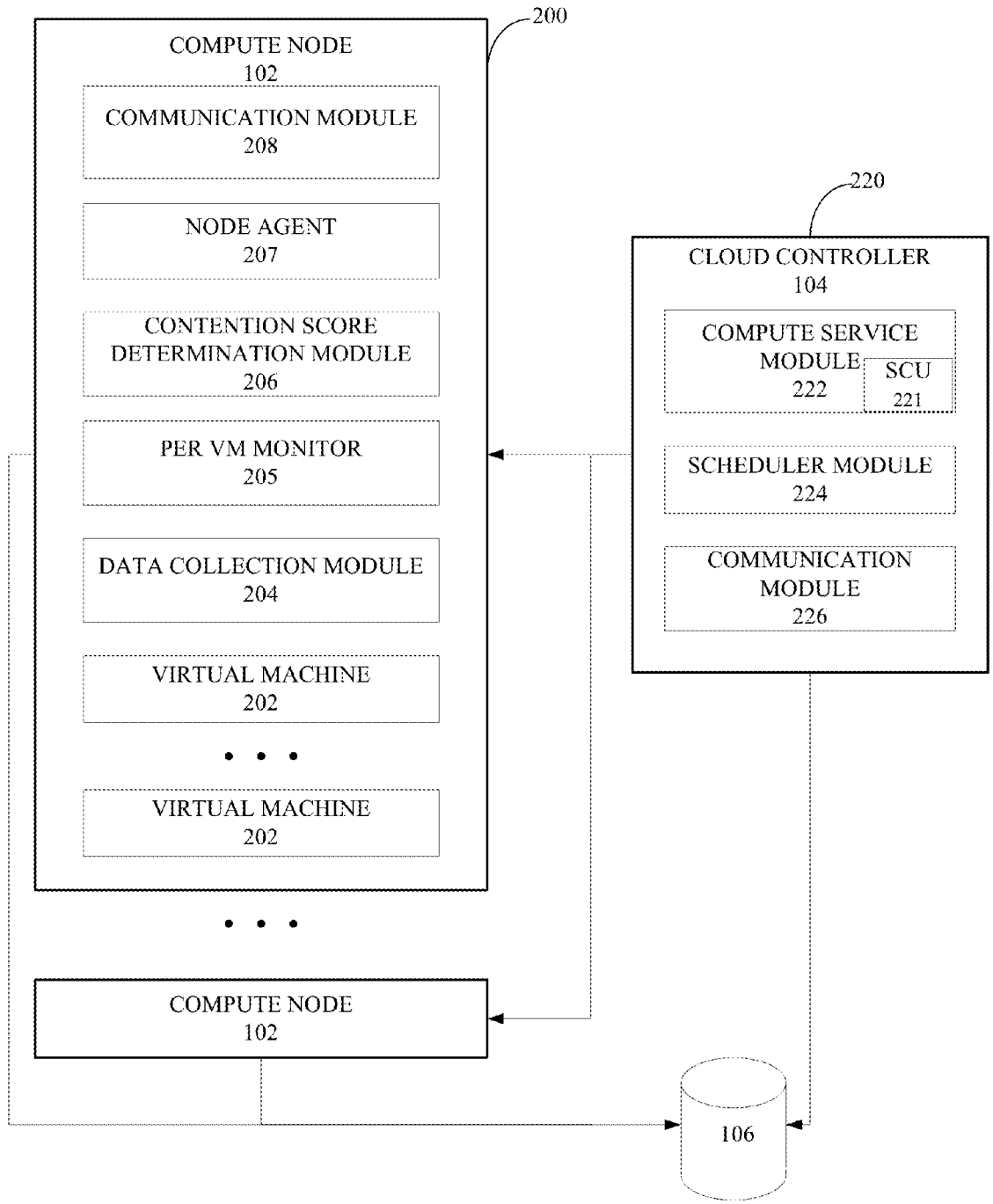
FIG. 2 illustrates another embodiment of a cloud computing system.

FIG. 2 illustrates one embodiment of a compute node 102, which establishes an environment 200 during operation. The illustrative environment 200 includes a number of virtual machines 202, a data collection module 204, a per virtual machine (Per VM) module 205, a contention score determination module 206, a node agent 207 and a communication module 208. The various modules of the environment 200 may be embodied as hardware, firmware, software, or a combination thereof.

According to one embodiment, each virtual machine 202 performs a cloud computing workload on the compute node 102. Each virtual machine 202 may be pinned, assigned, or otherwise allocated to one or more of the processor cores 122. In some embodiments, each virtual machine 202 may specify a number of desired virtual CPUs, and the virtual machine 202 may be assigned to that number of processor cores 122. In a multi-tenant cloud computing environment, each virtual machine 202 may be controlled by a different entity and therefore additionally may execute a workload having different performance characteristics. In particular, each virtual machine 202 may exert different pressure on the cache memory 130 of the compute node 102.

As described below, virtual machines 202 are instantiated and otherwise managed by cloud controller 104. Data collection module 204 collects performance data for the compute node 102. Data collection module 204 may collect data indicative of cache contention on the compute node 102, for example data measuring cache misses in the cache memory 130. Data collection module 204 may include individual data collectors for each processor 120 and/or processor core 122 of the compute node 102, or for each virtual machine 302. Data collection module 204 may filter the collected data to remove noise. The data collectors of data collection module 204 may communicate with each other asynchronously, for example using a message bus such as the zeromq message bus.

Per VM monitor 205 monitors utilization and performance of virtual machines 202. In one embodiment, Per VM monitor 205 identifies when a virtual machine is active. In such an embodiment, Per VM monitor 205 uses hardware events to monitor virtual machine or process activity using a per thread ID. Further, Per VM monitor 205 maintains a list of thread IDs for each process and samples per thread ID hardware counters at a predetermined interval (e.g., per second) using a performance analyzing tool (e.g., Performance Counters for Linux (perf)). In still a further embodiment, Per VM monitor 205 groups the per thread monitored data to per process performance, which is acquired by data collection module 204.

Contention score determination module 206 calculates a contention score as a function of the performance data collected by the data collection module 204. The contention score may include both a contention metric and a contention score level. The contention metric may include aggregated data describing cache misses for all processors 120 of the compute node 102. The contention score level may be generated by a heuristic algorithm, and may be selected from levels for low contention, medium contention, and high contention (e.g., via a form of quantization). In one embodiment, the contention score measures the cache memory 130 contention experienced on compute node 102. The contention score may be embodied as a tuple including the cache misses per some reference number of instructions (e.g., per thousand instructions), as well as a contention score level (e.g., high, medium, or low contention).

Node agent 207 implements a control process to perform overprovisioning at a compute node 102. According to one embodiment, node agent receives the virtual machine monitoring data from Per VM monitor 205 and dynamically readjusts resources to maintain performance at compute node 102, as will be described in more detail below.

Communication module 308 transmits performance data to cloud state database 106. The performance data is then accessible to cloud controller 104 through cloud state database 106. Communication module 308 may transmit the contention score as a tuple including the contention metric and the contention score level. Communication module 308 may use any communication method to interface with the other members of the system 100. For example, communication module 308 may be embodied as a message bus.

According to one embodiment, each compute node 102 communicates with cloud controller 104, which each may establish an environment 220 during operation. The illustrative environment 220 includes a compute service module 222, a scheduler module 224, and a communication module 226. The various modules of the environment 220 may be embodied as hardware, firmware, software, or a combination thereof. Compute service module 222 receives requests to instantiate a new virtual machine 202, and to schedule the new virtual machine 202 for execution on a compute node 102 selected by the scheduler module 324. Compute service module 222 may receive commands from any appropriate source. For example, compute service module 222 may receive commands from a cloud system administrator or from a cloud computing customer through a web-based control interface. As another example, in some embodiments, compute service module 222 may receive a command for a new virtual machine 202 based on demand for computing services, for example to scale to respond to application demand. In a further embodiment, compute service module 222 detects SLA violations based on the contention score while monitoring application performance. In such an embodiment, compute service module 222 determines control actions that are to be applied to restore the application performance to the specified SLA.

Scheduler module 224 selects an appropriate compute node 102 based on received performance data. In some embodiments, scheduler module 224 may be embodied as a filter scheduler that selects a compute node 102 having the lowest reported contention score level. When two or more compute nodes 102 have the lowest reported contention score level, the scheduler module 224 may select one randomly or by using any other available selection criteria. For example, in some embodiments, the scheduler module 224 may further sort compute nodes 102 and select the compute node 102 having the lowest contention metric.

Communication module 226 receives performance data from the cloud state database 106 for all compute nodes 102 within system 100. Communication module 226 may receive a tuple from the cloud state database 106 for each compute node 102 including the contention metric and the contention score level. Communication module 226 may use any communication method to interface with the other members of the system 100. For example, communication module 326 may be embodied as a message bus.

According to one embodiment, compute service module 222 includes service compute unit (SCU) 221. In such an embodiment, SCU 221 defines a service level objective (SLO) in terms of a compute consumption metric. The compute consumption metric is based on processor 122 performance characteristics (e.g., ability to execute instructions). In one embodiment, the compute consumption metric is measured as giga instructions per second (GIPS) rating. A processor 122 achieves a peak GIPS rating when executing a program that only has instructions of a type having a lowest cycles per instruction (CPI) or highest instructions per cycle (IPC). Thus, a compute performance metric is also calculated at compute service module 222 to qualify an actual GIPS using operational frequency.

According to one embodiment, SCU 221 is attached to each compute instance generated at compute service module 222. In this embodiment, SCU 221 is multiplied with allocated virtual cores to provide an allowed total consumption to a virtual machine 202. For example, Table 1 shows instance types and corresponding SLOs.

TABLE 1

| Instance Type & RAM | CPU (Virtual Cores*SCU) | SLO (example) |
|---|---|---|
| Extra large + 30 GB | 4 virtual cores with 4 SCU | High |
| Extra large + 15 GB | 4 virtual cores with 2 SCU | Medium |

Figure 3:
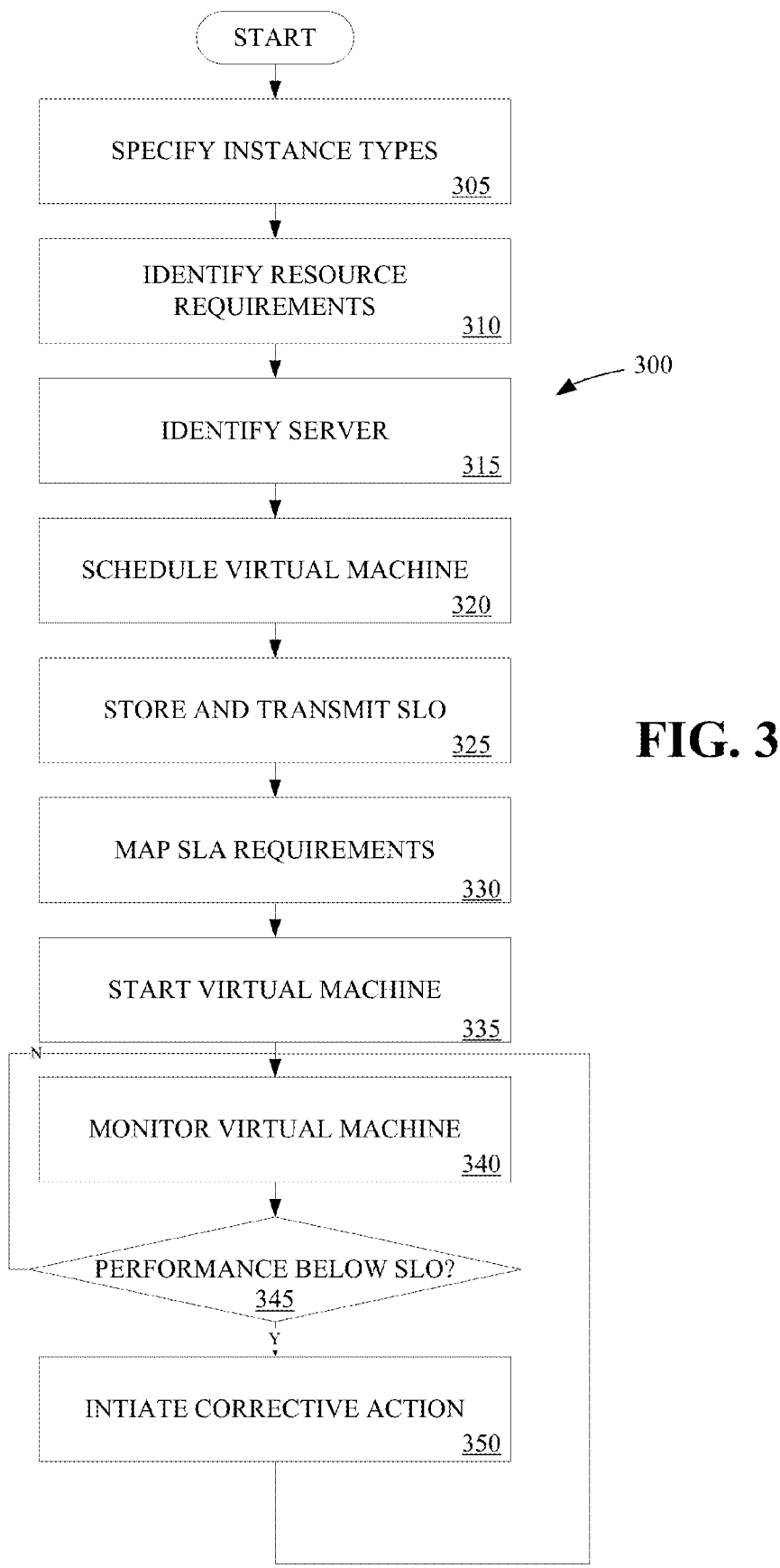
FIG. 3 is a flow diagram illustrating one embodiment of a process for performing service level objective (SLO) management.

According to one embodiment, a total and headroom capacity of a compute node 102 as a virtual machine is calculated. Additionally, the calculations measure whether the IPC provided to each instance matches the SLO. The calculations include the following:
  a. SCU_Theoretical=Total GIPS
  b. SCU_Actual=GIPS based on operating frequency.
  c. SCU_IPC_Expected=eg 1.27 (specific to Intel® Xeon E5 processor based on SPECint results)
  d. SCU_TPUT_Current=updated based on monitored data on the host
  e. SLO Error=SCU_Theoretical−SCU_Actual
  f. IPC error %=(SCU_TPUT_Current/SCU_TPUT_Expected)*100
  g. Node_Capacity_Max=(logical cores*total sockets) *SCU_Theoretical
  h. Node_Capacity_Allocated=(total_logical cores_allocated*SCU_Actual)
  i. Node_Capacity_Used=PC*total_logical cores_allocated*
  j. Node_Capacity_Headroom=Node_Capacity_Max−Node_Capacity_Allocated FIG. 3 is a flow diagram illustrating one embodiment a process 300 for performing SLO management for a virtual machine. Method 300 may be performed by processing logic that may comprise hardware (e.g., circuitry, dedicated logic, programmable logic, etc.), software (such as instructions run on a processing device), or a combination thereof. The processes of method 300 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-2 may not be discussed or repeated here.

At processing block 305, instance types similar to those shown in Table 1 and SLAs are provided in a user interface implemented at compute service module 222 in response to a request to instantiate a new virtual machine 202. Thus, a virtual machine is created using compute service module 222 that belongs to one of multiple instances types specified and supported by SCU 221. At processing block 310, compute service module 222 identifies resource requirements for the virtual machine 202. At processing block 315, Scheduler 224 identifies a compute node 102 on which to schedule the virtual machine 202. In one embodiment, scheduler module 224 takes into consideration the resource requirements of the virtual machine 202 and the current state of the various control nodes 102 to determine the initial placement for the virtual machine 202.

At processing block 320, scheduler module 224 schedules the virtual machine 220 on the identified compute node 102. At processing block 325, the SLO parameters for the virtual machine 202 is stored within database 106 and transmitted to the node agent 207 at the identified compute node 102 at which the virtual machine 202 will execute (e.g., using the rabbitmq messaging). At processing block 330, the SLO requirements are mapped to resources on the compute node 102. At processing block 330, the virtual machine 202 begins operation at the compute node 102. According to one embodiment, adjustments are implemented at the compute node 102 according to a fair overprovisioning process described below.

At processing block 340, Per VM monitor 205 measures utilization and performance of the virtual machine 202. Because applications exhibit phase changes or experience varying load over time, resource usage also varies. Due to such variations across all of the virtual machines 202 executing on a compute node 102, contention faced by a virtual machine 202 of interest also varies. Consequently, dynamic readjustment may be performed based on continuous monitoring by Per VM monitor 205.

At decision block 345, node agent 207 determines whether the virtual machine 202 performance is below the SLO parameters based on monitored performance results received from Per VM monitor 205. According to one embodiment, node agent 207 uses the current virtual machine 202 performance and expected virtual machine 202 performance based on allocated the SLO parameters. If the virtual machine 202 performance is not below the SLO parameters, control is returned to processing block 340 where the virtual machine 202 continues to be monitored. If, however, the virtual machine 202 performance is below the SLO parameters, a corrective action is initiated, processing block 350. In one embodiment, a magnitude of change of resource allocation is calculated to modify the resource allocation to achieve expected performance.

According to one embodiment, node agent 207 may perform boosting, throttling or migration actions to adjust resource allocation. Boosting increases resources when an application performance falls below expected levels. Throttling reduces resources provided to the application. In one embodiment, reduction is initiated when such a reduction of resource does not result in SLA violation. For example, streaming applications do not exhibit reduction in cache miss rate when additional cache is provided. Similarly, when cache availability is reduced, the cache miss rate does not increase significantly. Migration involves migrating a virtual machine 202 to either a different socket on the same compute node 102 or to a different compute node 102 in order to reduce interference from noisy neighbors. This effectively increases the resources available to the virtual machine 202 that was migrated.

Figure 4:
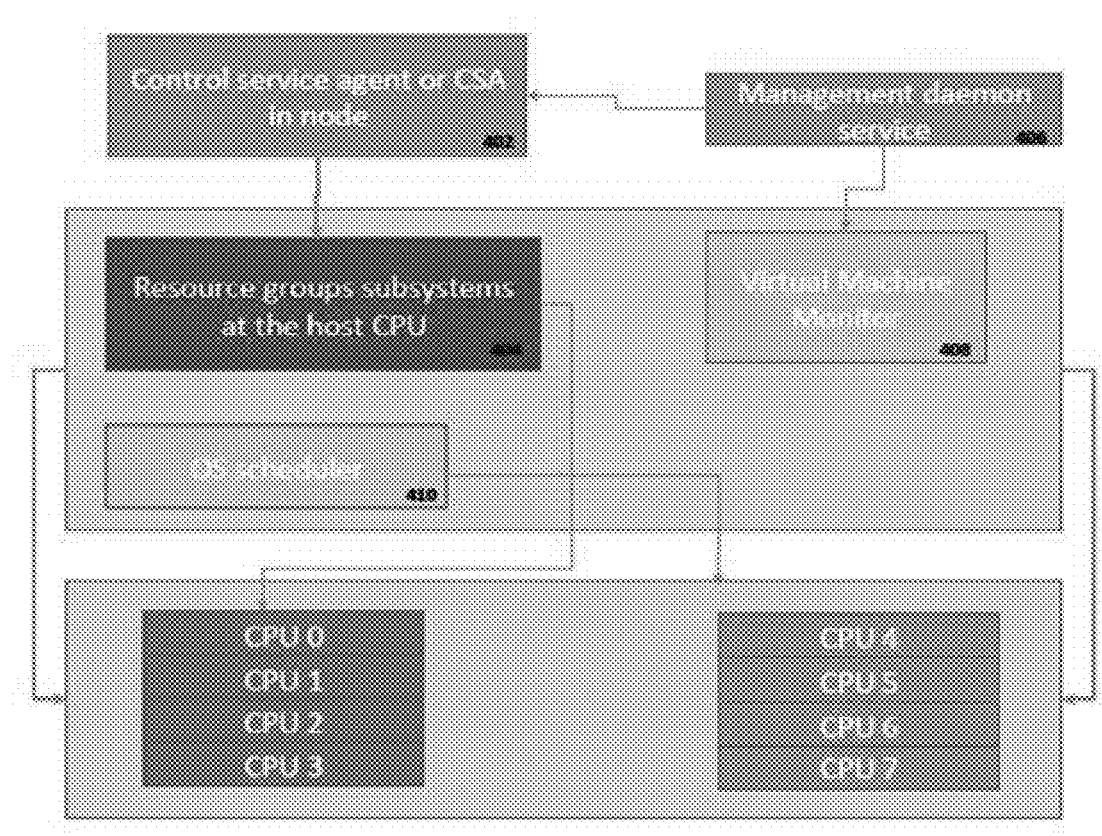
FIG. 4 illustrates one embodiment of a high level functional description.

According to one embodiment, node agent 207 implements resource controls to limit, account, and isolate resource usage (e.g., CPU, memory, disk I/O, etc.) to manage a CPU Controller and CPUSET Controller subsystem in order to meet the application SLAs by reducing resource contention and increasing predictability in performance, and to prevent a single or group of virtual machines from monopolizing resources, or impacting other environments. FIG. 4 illustrates one embodiment of a high level functional description for performing virtual machine resource allocation.

Figure 5:
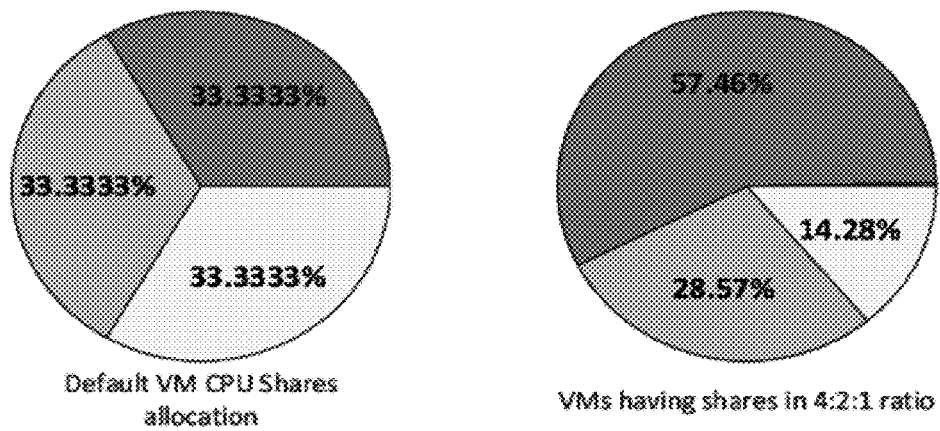
FIG. 5 illustrates one embodiment of virtual machine allocation.

In one embodiment, a user space daemon (control service agent or CSA) 402 is implemented to interact with kernel resource groups subsystems 404 to initialize and mount the resource group controllers. Additionally, CSA interacts with a virtualization management daemon service 406 to perform resource allocation and partitioning of compute node 102 resources and dynamic resource assignment. CPUSET provides a mechanism for assigning a set of pCPUs to a set of virtual vCPUs to enable a mapping to constrain CPU placement of the virtual machines to only the resources within a VM's current CPUSET. In one embodiment, the mapping forms a nested hierarchy visible in a virtual file system that is controlled by CSA. Resource groups subsystems 404 define CPU time shares that are utilized for each virtual machine. CSA 402 uses this group to manage CPU shares, wherein each group gets shares hierarchically. In one embodiment, CPU shares are set to 1024 as a default. However, setting CPU shares to a higher value provides the CPU groups a higher quantum of the CPU, which is performed by CSA 402 boosting or throttling a virtual machine. According to one embodiment, OS scheduler 410 is a router provides for scheduling (e.g., round-robin or fair share). FIG. 5 illustrates one embodiment of virtual machine shares allocation.

According to one embodiment, a fixed resource allocation model partitions system resources between all virtual machines such that the total resources requested is equal to the resource available. In such an embodiment, the resources requested by a virtual machine is based on its maximum consumption such that:

$$SystemResources = \sum_{i=0}^{n} Resource(VM_i)$$

However due to variation in phases, the virtual machines do not continuously consume all of the requested resources. Therefore resources may be overprovisioned, and shared between virtual machines. In an overprovisioned environment, the total system resources available will be lesser than the sum of the resources required by each VM. The resources are dynamically reassigned as shown in the resource model:

$$SystemResources = \Sigma_{i=0}^{n} Resource(VM_i) * Over\ Subscription\ Factor$$

According to one embodiment, resource optimizing and fair over provisioning may be implemented by logically partitioning processor 120 resources on a per core basis. Such a logical portioning approach is suitable for scenarios where placement of virtual machines are to be implemented in such a way as to be contained exclusively in a core where no other virtual machine else competes for available bandwidth within that core. For instance, noisy neighbor scenarios can be handled with this approach.

Figure 6:
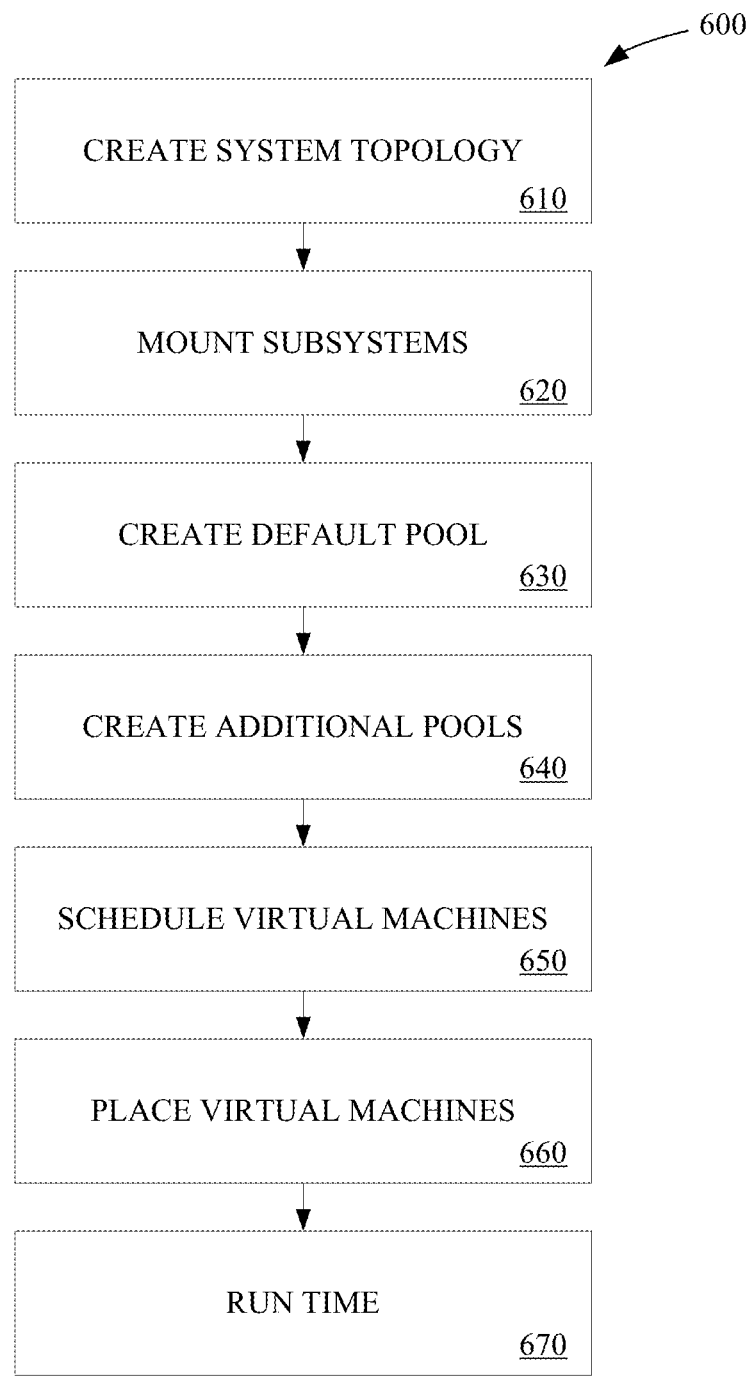
FIG. 6 is a flow diagram illustrating one embodiment of a fair overprovisioning process.

FIG. 6 is a flow diagram illustrating one embodiment of a process 600 for performing fair overprovisioning. Method 600 may be performed by processing logic that may comprise hardware (e.g., circuitry, dedicated logic, programmable logic, etc.), software (such as instructions run on a processing device), or a combination thereof. The processes of method 600 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 may not be discussed or repeated here.

At processing block 68, a system topology is created using resource groups 404 CPU and CPUSET controller subsystems. At processing block 620, these subsystems are mounted by a CSA at a specified path. At processing block 630, a system default pool is created to exclusively reserve some CPU cores for the system daemons and other processes to run. At processing block 640, additional pools are created on a per socket basis by logically creating resource group cpusets for all logical cores belonging to the particular socket.

At processing block 650, scheduler module 224 schedules virtual machines 202 on a compute node 102 and sends an attached SLO message with each virtual machine 202 that includes the number of vCPUs on which the virtual machine 202 is to run, along with other elements (e.g., a requested compute service modules 222). At processing block 660, the virtual machines 202 are placed and the requested compute service modules 222 are translated into cgroup 404 CPU shares. As a result, minimum guarantee is ensured.

According to one embodiment, the virtual machine 202 are placement is performed by pinning the vCPUs corresponding to the virtual machine to the CPUSET subsystem. In addition, a new hierarchy is created under CPU controller resource group subsystem with a virtual machine universally unique identifier (UUID) as a new control group. Scheduler module 224 may place additional virtual machines on the compute node 102 as long as the total platform capacity is utilized. At processing block 670, execution begins.

In one embodiment, the virtual machine 202 run time dynamics typically indicate that actual usage is less even though the virtual machine 202 SLO requested more CPU bandwidth reservation. This allows compute service module 222 to make a decision of densely packing the load by a predefined over overprovisioning factor. In a further embodiment, a virtual machine 202 migration decision is made when the platform capacity is reached in order to honor its SLO. The above-described model offers a powerful and flexible set of resource controls and a wide range of resource management policies that may be utilized and provide differentiated Quality of Service to the participating virtual machines 202.

Figure 7:
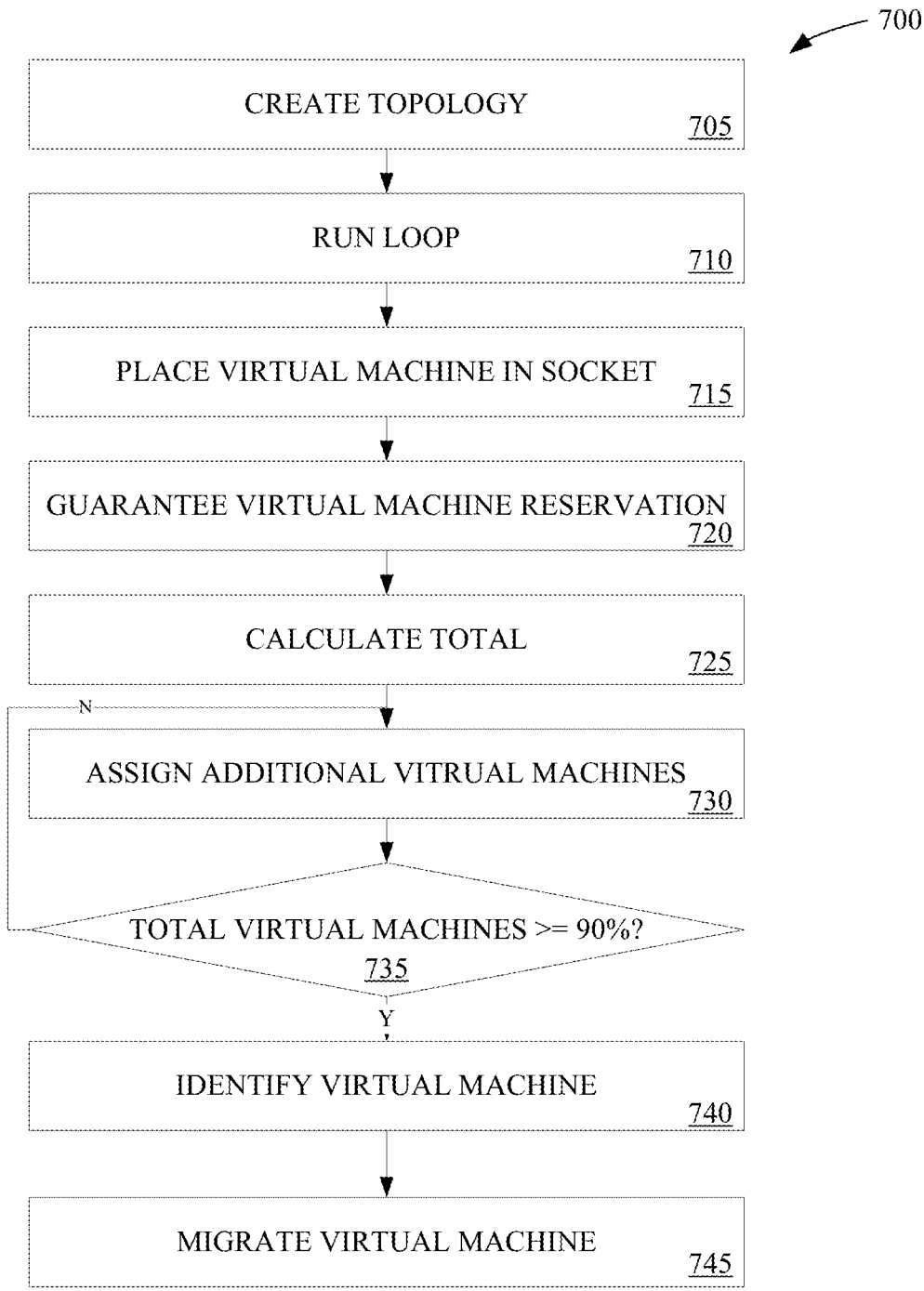
FIG. 7 is a flow diagram illustrating one embodiment of a fair overprovisioning process.
Figure 8:
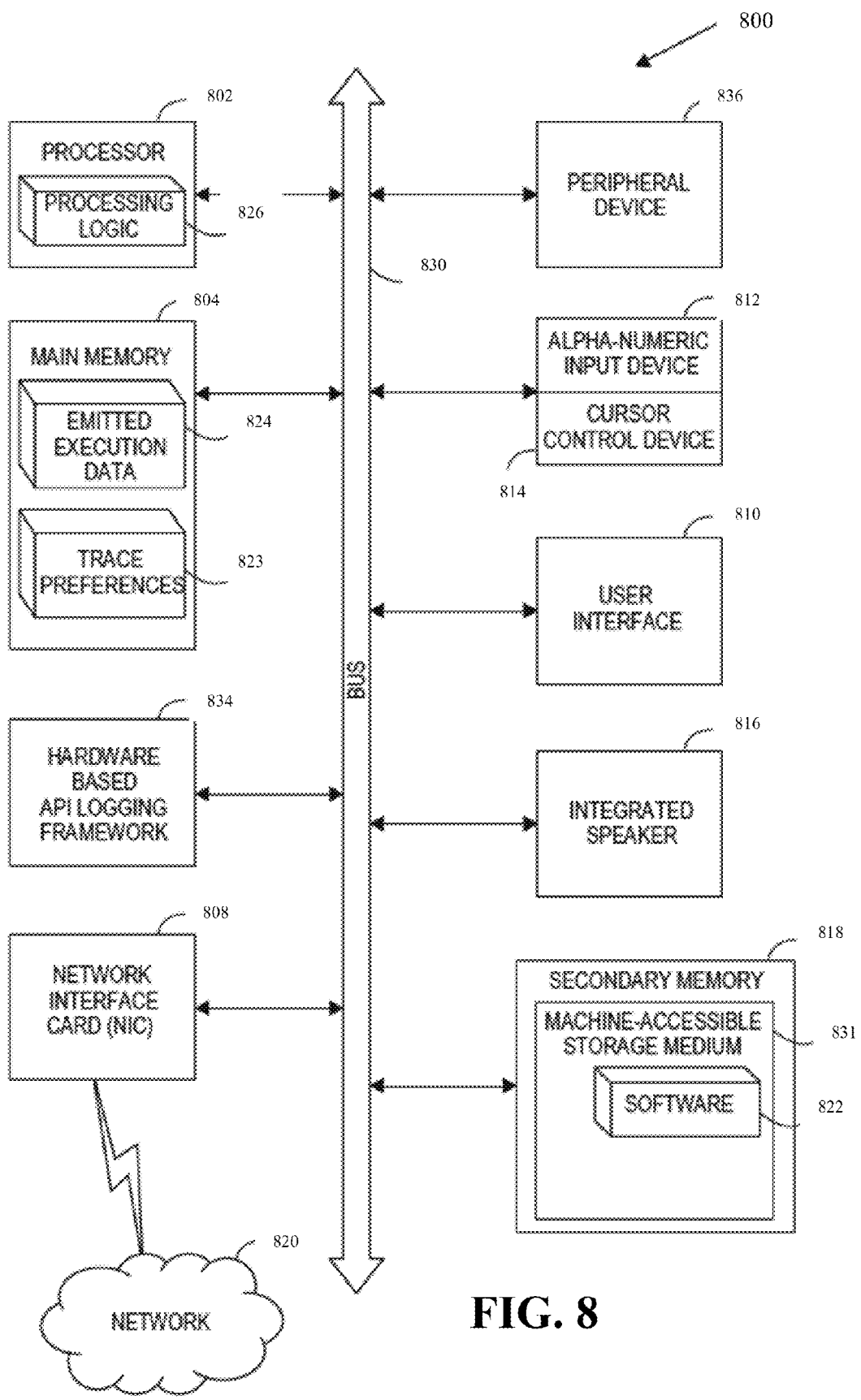
FIG. 8 illustrates one embodiment of a computer system.

FIG. 7 is a flow diagram illustrating one embodiment of a process 700 for performing fair over provisioning. Method 700 may be performed by processing logic that may comprise hardware (e.g., circuitry, dedicated logic, programmable logic, etc.), software (such as instructions run on a processing device), or a combination thereof. The processes of method 700 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 may not be discussed or repeated here.

At processing block 705, a platform topology is created on a per socket basis. In one embodiment, a pool of CPUs are reserved per socket such that:

$$\text{Total Platform SUs} = \Sigma_{socket=0}^{n} \text{Per Socket SCUs},$$

where a compute service module 222=2 SCUs.

At processing block 78, a loop is run to accept incoming SLO messages for new scheduled virtual machines 202 by scheduler 224. In one embodiment, a virtual machine SLO message includes SCU requirements for each vCPU per virtual machine 202. At processing block 715, the virtual machine SLO is honored by placing the virtual machine 202 on an appropriate socket. In one embodiment, this process is performed by pinning vCPUs, using resource groups 404, to logical CPUs that belong to the particular socket. At processing block 720, the virtual machines 202 reservation is guaranteed using proportionate resource groups 404 shares. Additionally, a limit equal to a reservation value included in the SLO message is applied. At processing block 725, the total used SCUs per socket is calculated and database 106 is updated. At processing block 730, additional virtual machines 202 are assigned until:

$$\Sigma \text{VM requested} \leq \text{Total Socket Gips}$$

Full capacity is reached once the condition is met. Subsequently, an observer loop periodically checks to detect the total used SCUs per socket. Overprovisioning may often be performed since virtual machines 202 typically consume much less resources than requested. However, overprovisioning cannot be achieved when virtual machines 202 are using the requested resources. According to one embodiment, overprovisioning occurs for a factor of ρ when:

$$\Sigma \text{VM current usage} \leq \text{Total Requested SCUs, where}$$

ρ=Total Socket SCUs−ΣVM current usage−τ, where τ=8%

At decision block 735, a determination is made as to whether the total number of currently used virtual machine SCUs≥90% Socket SCUs. If the condition has not met, control is returned to processing block 730 where additional virtual machines are assigned to the socket. However, a determination that the total number of currently used virtual machine SCUs≥90% Socket SCUs indicates that one or more of the virtual machines 220 is now trying to use its reserved SCUs. However, the virtual machine 220 will soon begin suffering when the total used SCUs becomes 100% of the socket capacity (e.g., resources have been overprovisioned).

At processing block 470, Per VM Monitor 205 reads data to identify which virtual machine 220 is attempting to claim its share. In one embodiment, the data includes telemetry data read from registers within processor 120 and performance events mapped to the virtual machine 220. In a further embodiment, the virtual machine 220 is temporarily assigned to a CPU in the pool of CPUs. In a further embodiment, the observer loop monitors the system for a predetermined time interval to determine if the system attains an equilibrium state. In such an embodiment, ρ is readjusted if necessary to maintain a steady state. At processing block 745, the identified virtual machine 220 is migrated based on a policy that ensures least disturbance to the cloud.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and persistent multi-tenant data base implementations), which communicate with each other via a bus 830. Main memory 1004 includes emitted execution data 1024 (e.g., data emitted by a logging framework) and one or more trace preferences 1023 which operate in conjunction with processing logic 1026 and processor 1002 to perform the methodologies discussed herein.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality of the above-described mechanism.

The computer system 1000 may further include a network interface card 1008. The computer system 1000 also may include a user interface 810 (such as a video display unit, a liquid crystal display (LCD), or a cathode ray tube (CRT)), an alphanumeric input device 812 (e.g., a keyboard), a cursor control device 814 (e.g., a mouse), and a signal generation device 816 (e.g., an integrated speaker). The computer system 1000 may further include peripheral device 836 (e.g., wireless or wired communication devices, memory devices, storage devices, audio processing devices, video processing devices, etc. The computer system 1000 may further include a Hardware based API logging framework 834 capable of executing incoming requests for services and emitting execution data responsive to the fulfillment of such incoming requests.

The secondary memory 818 may include a machine-readable storage medium (or more specifically a machine-accessible storage medium) 831 on which is stored one or more sets of instructions (e.g., software 1022) embodying any one or more of the methodologies or functions described above. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008. The machine-readable storage medium 831 may include transitory or non-transitory machine-readable storage media.

Portions of various embodiments may be provided as a computer program product, which may include a machine-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a compute node of a cloud computing cluster comprising a node agent to receive a virtual machine and a service level objective compute consumption metrics (SLO) parameters from a cloud controller and map the SLO parameters to resources at the compute node and a Per VM monitor to monitor performance of the virtual machine, wherein the node agent receives performance data from the Per VM monitor and dynamically adjusts performance of the virtual machine based on the performance data.

Example 2 includes the subject matter of Example 1, wherein the Per VM monitor uses hardware events to monitor the virtual machine activity using a per thread identifier.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A compute node of a cloud computing cluster comprising:
    one or more processors configured to implement a plurality of virtual machines, each of the one or more processors having at least one central processing unit (CPU) core, each virtual machine constrained to consume resources within one of a plurality of subsets of CPU cores of the one or more processors of the compute node;
    the one or more processors configured to establish an operating environment, the operating environment including a node agent in communication with a cloud controller for controlling scheduling any one or more of the plurality of virtual machines, the node agent configured to:
    receive a request from the cloud controller to schedule a virtual machine to a specified one of the subsets of CPU cores, the request including service level objective (SLO) parameters representing a consumption allowance of resources for enabling the virtual machine to achieve an expected performance based on performance characteristics of the one or more processors;
    map the SLO parameters to resources of the compute node, wherein mapping the SLO parameters to resources of the compute node comprises computing consumption metrics corresponding to the performance characteristics of the one or more processors; and
    initiate an overprovisioning process to allocate available resources within the specified subset of CPU cores in accordance with the mapped SLO parameters, wherein the allocated available resources are less than a total of all of the consumption allowances of resources requested for all virtual machines scheduled to the specified subset of CPU cores;
    the operating environment established by the one or more processors further including a Per VM monitor to monitor performance data of the virtual machine corresponding to the mapped SLO parameters,
    wherein the node agent receives performance data of the virtual machine from the Per VM monitor and dynamically modifies resource allocation within the specified subset of CPU cores to achieve the expected performance of the virtual machine.

2. The compute node of claim 1, wherein the Per VM monitor uses hardware events to monitor the virtual machine activity using a per thread identifier.

3. The compute node of claim 1, wherein the node agent determines whether the virtual machine performance data received from the VM monitor is below an expected virtual machine performance data based on the mapped SLO parameters.

4. The compute node of claim 3, wherein the node agent performs a corrective action upon determining that the virtual machine performance data received from the VM monitor is below the expected virtual machine performance data based on the mapped SLO parameters.

5. The compute node of claim 4, wherein the node agent calculates a magnitude of change of resource allocation to dynamically modify resource allocation within the specified subset of CPU cores to achieve expected virtual machine performance.

6. The compute node of claim 5, wherein the node agent performs one of boosting, throttling and migration actions to modify resource allocation.

7. The compute node of claim 5, wherein the node agent performs a throttling action modify resource allocation.

8. The compute node of claim 5, wherein the node agent performs a migration action modify resource allocation.

9. The compute node of claim 1, wherein the overprovisioning process to allocate resources is performed for all virtual machines scheduled to the specified subset of CPU cores.

10. The compute node of claim 9, wherein the overprovisioning process to allocate resources within the specified subset of CPU cores comprises logically partitioning central processing unit (CPU) resources per CPU core included in the specified subset of CPU cores of the compute node.

11. The compute node of claim 9, wherein the the plurality of subsets of CPU cores is created from pools of CPU cores per a CPU socket included in the compute node.

12. The compute node of claim 1, wherein to map the SLO parameters to resources of the compute node comprises translating the SLO parameters to at least one of compute time, processor frequency, cache, memory bandwidth, disk bandwidth, network bandwidth and memory size.

13. A method for managing virtual machine performance at a compute node comprising:
    configuring central processing unit (CPU) cores of a compute node into a plurality of subsets of CPU cores;
    receiving a request to schedule a virtual machine to a specified one of the subsets of CPU cores, the request including service level objective (SLO) parameters from a cloud controller responsible for scheduling virtual machines on the compute node, wherein the SLO parameters represent a consumption allowance of resources for enabling the virtual machine to achieve an expected performance based on performance characteristics of one or more processors of the compute node, each of the one or more processors having at least one CPU core;
    mapping the SLO parameters to resources of the compute node, including computing consumption metrics corresponding to the performance characteristics of the one or more processors of the compute node;
    initiate an overprovisioning process to allocate available resources within the specified subset of CPU cores in accordance with the mapped SLO parameters, wherein the allocated available resources are less than a total of all of the consumption allowances of resources requested for all virtual machines scheduled to the specified subset of CPU cores;
    monitoring consumption of the available resources and performance of the virtual machine corresponding to the mapped SLO parameters; and dynamically modify resource allocation within the specified subset of CPU cores to achieve the expected performance of the virtual machine.

14. The method of claim 13, wherein monitoring the performance of the virtual machine comprises:
   determining whether the virtual machine performance is below an expected virtual machine performance based on the SLO parameters; and
   performing a corrective action upon determining that the virtual machine performance is below the expected virtual machine performance.

15. The method of claim 14, further comprising calculating a magnitude of change of resource allocation to dynamically modify resource allocation within the specified subset of CPU cores to achieve expected virtual machine performance.

16. The method of claim 15, further comprising performing one of boosting, throttling and migration actions to dynamically modify resource allocation.

17. The method of claim 13, wherein the overprovisioning process includes allocating compute node resources for all virtual machines scheduled to the specified subset of CPU cores.

18. The method of claim 17, wherein the overprovisioning process to allocate resources within the specified subset of CPU cores comprises logically partitioning central processing unit (CPU) resources per CPU core included in the specified subset of CPU cores of the compute node.

19. The method of claim 17, wherein the the plurality of subsets of CPU cores is created from pools of CPU cores per a CPU socket included in the compute node.

20. A non-transitory computer readable medium having instructions, which when executed by a processor, cause the processor to perform:
   configuring central processing unit (CPU) cores of a compute node into a plurality of subsets of CPU cores;
   receiving a request to schedule a virtual machine to a specified one of the subsets of CPU cores, the request including service level objective (SLO) parameters from a cloud controller responsible for scheduling virtual machines on the compute node, wherein the SLO parameters represent a consumption allowance of resources for enabling the virtual machine to achieve an expected performance based on performance characteristics of one or more processors of the compute node, each of the one or more processors having at least one CPU core;
   mapping the SLO parameters to resources of the compute node, including computing consumption metrics corresponding to the performance characteristics of the one or more processors of the compute node;
   initiate an overprovisioning process to allocate available resources within the specified subset of CPU cores in accordance with the mapped SLO parameters, wherein the allocated available resources are less than a total of all of the consumption allowances of resources requested for all virtual machines scheduled to the specified subset of CPU cores;
   monitoring consumption of the available resources and performance of the virtual machine corresponding to the mapped SLO parameters; and
   dynamically modify resource allocation within the specified subset of CPU cores to achieve the expected performance of the virtual machine.

21. The non-transitory computer readable medium of claim 20, wherein monitoring the performance of the virtual machine comprises:
   determining whether the virtual machine performance is below an expected virtual machine performance based on the SLO parameters; and
   performing a corrective action upon determining that the virtual machine performance is below the expected virtual machine performance.

22. The non-transitory computer readable medium of claim 21, having instructions, which when executed by a processor, further cause the processor to perform calculating a magnitude of change of resource allocation to dynamically modify resource allocation within the specified subset of CPU cores to achieve expected virtual machine performance.

23. The non-transitory computer readable medium of claim 22, having instructions, which when executed by a processor, further cause the processor to perform one of boosting, throttling and migration actions to dynamically modify resource allocation.

24. The non-transitory computer readable medium of claim 20, wherein the overprovisioning process includes instructions to allocate compute node resources for all virtual machines scheduled to the specified subset of CPU cores.

* * * * *